United States Patent [19]

Bender et al.

[11] Patent Number: 5,268,185
[45] Date of Patent: *Dec. 7, 1993

[54] PROCESS FOR TREATING RED MEAT TO CONTROL BACTERIAL CONTAMINATION AND/OR GROWTH

[75] Inventors: Fredric G. Bender, Houston; Eugene Brotsky, Pittsburgh, both of Pa.

[73] Assignee: Rhone-Poulenc Inc., Monmouth Junction, N.J.

[ * ] Notice: The portion of the term of this patent subsequent to Mar. 9, 2010 has been disclaimed.

[21] Appl. No.: 931,138

[22] Filed: Aug. 17, 1992

Related U.S. Application Data

[63] Continuation of Ser. No. 712,245, Jun. 7, 1991, Pat. No. 5,192,570.

[51] Int. Cl.$^5$ ............................................. A23B 4/02
[52] U.S. Cl. ..................................... 426/92; 426/262; 426/641
[58] Field of Search .......................... 426/641, 92, 262

[56] References Cited

U.S. PATENT DOCUMENTS

| | | |
|---|---|---|
| 30,023 | 6/1979 | Hawley et al. |
| 1,774,310 | 8/1930 | Bates |
| 2,770,548 | 11/1956 | Hall et al. |
| 2,957,770 | 10/1960 | Freund et al. |
| 3,493,392 | 2/1970 | Swartz |
| 3,615,686 | 10/1971 | England |
| 3,620,767 | 11/1971 | Swartz |
| 3,681,091 | 8/1972 | Kohl et al. |
| 3,705,040 | 12/1972 | Bynagte |
| 3,726,962 | 4/1973 | Vanstrom et al. |
| 3,775,543 | 11/1973 | Zyss |
| 3,782,975 | 1/1974 | Zyss |
| 3,989,851 | 11/1976 | Hawley et al. |
| 4,071,635 | 1/1978 | Lindl et al. |
| 4,075,357 | 2/1978 | Szczesniak et al. |
| 4,168,322 | 9/1979 | Buckley et al. |
| 4,293,578 | 10/1981 | Stone |
| 4,382,098 | 5/1983 | Bolin et al. |
| 4,407,831 | 10/1983 | Swartz |
| 4,431,679 | 2/1984 | Crawford |
| 4,517,208 | 5/1985 | Crawford |
| 4,592,892 | 6/1986 | Ueno et al. |
| 4,683,139 | 7/1987 | Cheng |
| 4,781,934 | 11/1988 | Shimp et al. |
| 4,810,514 | 3/1989 | Guenther |
| 5,069,922 | 12/1991 | Brotsky et al. |

FOREIGN PATENT DOCUMENTS

| | | |
|---|---|---|
| 847280 | 7/1970 | Canada |
| 935413 | 8/1963 | United Kingdom |

OTHER PUBLICATIONS

*Bacteriolytic Action of Phosphates*, G. Pacheco, et al., Mems Institute Oswaldo Cruz, 52(2), pp. 405-414.

"Chemicals Used in Food Products," National Academy of Sciences, National Research Counsel.

*Chemical Pasteurization of Poultry Meat*, J. S. Teotia, Dissertation Abstracts Int'l B. 1974, 34(a), p. 4142.

"Polyphosphate Use in Meat and Other Muscle Foods," Eugene Brotsky, et al., Proceedings of the Meat Industry Research Conference 1973, pp. 107-118.

*The Antimicrobial Effect of Phosphate With Particular Reference to Food Products*, L. L. Hargreaves, et al., The British Food Manufacturing Industries Research Association, Scientific and Technical Surveys, No. 76, Apr. 1972, pp. 1-20 at 12.

Grant, Hackh's Chemical Dictionary, 4th edition, McGraw Hill Company, New York, 1969, p. 514.

"Effects of Type and Concentration of Phosphate and Amount of Salt and Brine on WHC, Color and Consistency of Cooked Meat Products," G. Barbieri, et al., Industria Conserve 1989, 64:313.

(List continued on next page.)

*Primary Examiner*—Carolyn Paden
*Attorney, Agent, or Firm*—Scully, Scott, Murphy & Presser

[57] ABSTRACT

The surface of red meat is treated with an trialkali metal orthophosphate to reduce, remove, retard or control salmonella, campylobacter, listeria, and spoilage bacteria without causing organoleptic depreciation of the meat, including color change.

5 Claims, No Drawings

OTHER PUBLICATIONS

"The Influence of Scald Water pH on the Death Rates of *Salmonella typhimurium* and Other Bacteria Attached to Chicken Skin," T. J. Humphrey, et al., Journal of Applied Bacteriology 1984, 57(2), pp. 355–359.

"The Effect on pH Adjustment on the Microbiology of Chicken Scald-tank Water with Particular Reference to the Death Rate of Salmonellae," T. J. Humphrey, et al., Journal of Applied Bacteriology 1981, 51, pp. 517–527.

"Phosphate and Heat Treatments to Control Salmonella and Reduce Spoilage and Rancidity on Broiler-Carcasses," J. E. Thompson, et al., Poultry Science 1979, 58, pp. 139–143.

PROCESS FOR TREATING RED MEAT TO CONTROL BACTERIAL CONTAMINATION AND/OR GROWTH

This is a continuation of copending application Ser. No. 712,245, filed on Jun. 7, 1991.

The present invention relates to an improved process for reducing the level of and retarding the growth of bacteria, on newly slaughtered raw red meat carcasses without causing organoleptic depreciation thereof.

BACKGROUND OF THE INVENTION

The invention relates to a treatment step made during slaughter of fresh meat and more particularly to treating pork, beef, veal, mutton, lamb and goat carcasses with a solution of alkali metal orthophosphate to remove, retard or reduce bacterial contamination and/or growth without causing substantial organoleptic depreciation of the meat.

Red meat, during and after slaughter, may contain or become contaminated with certain undesirable bacteria such as salmonella, campylobacter, listeria, spoilage bacteria, and the like. The red meat is processed by removing the hide, eviscerating, cooling and cutting into larger cuts for fresh, cured meat or boxed meat. The fresh red meat obtained after evisceration is chilled by hanging the sides of red meat at a temperature usually below 10° C. Beef is hung for a considerable period to allow natural enzymes to tenderize the beef. Pork is simply cooled. For certain primal cuts, such as ham, bacon, corned beef and pastrami the cuts are cured by chilling below 10° C. followed by injection of a solution containing salt, nitrite and/or nitrate, sweetener, cure accelerator, one or more polyphosphates, spices and flavorings. The meat is prepared to 105% to 130% of its weight with curing solution. Boxed meat is cut into primal cuts after chilling, vacuum packaged and boxed.

As disclosed in U.S. Pat. No. 3,782,975 to Zyss, primal cuts of red meat are maintained between 32°-42° F. (for about 3 to 5 days). During that period, the sodium nitrite reacts with the myoglobin of the meat to form nitrosomyoglobin which insures good color to the meat. The addition of the curing solution to the primal cuts imparts improved texture, tenderness, flavor and color that would be lacking if the curing brine was not added to the meat. Zyss teaches that for people with a sodium problem, a pumping solution of potassium salts including potassium orthophosphates could be employed.

A second patent to Zyss, U.S. Pat. No. 3,775,543, suggests the addition of phosphate compositions including potassium orthophosphates to processed meats as a binding agent in from 0.2 to 2.0% by weight of the mix. Zyss clearly avoids alkaline pH since he indicated that alkaline pH decreases the meat's shelf life. Zyss neutralizes with acid to pH 6.4 to 6.8. In example II, Zyss prepares a bologna product using about 1% tripotassium orthophosphate. Surprisingly, we have found that surface orthophosphate treatment increased shelf life.

Ueno, et al. U.S. Pat. No. 4,592,892, uses ethanol to sterilize certain food and processing machinery and may employ a carbonate and/or trialkali orthophosphate combined with the ethanol to enhance the ethanol's effectiveness.

Several patents to Swartz, U.S. Pat. Nos. 3,493,392, 3,620,767, and Canadian Patent No. 847,280, use phosphates including sodium orthophosphate as a processing aid for fish.

Bynagte, U.S. Pat. No. 3,705,040, uses phosphates to help remove shrimp from their shells. Sodium orthophosphate at 2-15% with other ingredients can be employed.

Cheng, U.S. Pat. No. 4,683,139, teaches a process for prepackaged fresh meat at retail wherein the shelf life of the meat is increased by treatment with an aqueous solution of an alkali metal salt of certain phosphate compounds, a reducing compound such as ascorbic acid and a sequestering or chelating agent such as citric acid. The phosphate can be an orthophosphate, pyrophosphates, tripolyphosphates and hexametaphosphates. Meat pH is below neutral.

Szczesniak et al., U.S. Pat. No. 4,075,357, teaches salt combined with a secondary salt selected from alkali metal salts of organic acids and trisodium orthophosphate, polyphosphate, metaphosphate and ultraphosphate. Citrates are preferably combined with sodium chloride. These mixtures are used to control water activity in intermediate moisture cooked food.

Kohl, et al., U.S. Pat. No. 3,681,091, teaches treating foods including fish fillet with 10% solutions of medium chain length polyphosphates.

Freund, et al., U.S. Pat. No. 2,957,770, teaches improving the properties of meat with a casein composition which can include inorganic orthophosphates such as disodium hydrogen orthophosphate.

Many treatment systems for poultry have been suggested. It has been reported that the thermal death rate of salmonellae can be increased during scalding by elevating the pH of the scald water to pH 9.0±0.2. Agents such as sodium hydroxide, potassium hydroxide, sodium carbonate, and trisodium phosphate have been reported as effective pH adjusting agents for use in increasing the thermal death rate of the bacteria. Trisodium phosphate was reported as least effective in increasing the death rate. See "The Effect on pH Adjustment on the Microbiology of Chicken Scald-tank Water With Particular Reference to the Death Rate of Salmonellae", T. J. Humphrey, et al., Journal of Applied Bacteriology 1981, 51, pp. 517–527.

T. J. Humphrey, et al. have also reviewed the pH effect of scald water on Salmonella on chicken skin. See "The Influence of Scald Water pH on the Death Rates of *Salmonella typhimurium* and Other Bacteria Attached to Chicken Skin", Journal of Applied Bacteriology 1984, 57 (2), pp. 355–359. Scald water adjusted to pH 9±0.2 as in the 1981 paper can help to reduce external and internal cross-contamination of carcasses by salmonellas.

"Phosphate and Heat Treatments to Control Salmonella and Reduce Spoilage and Rancidity on Broiler Carcasses", J. E. Thompson, et al., Poultry Science, 1979, 58, 139–143 teach kenaphosphate a blend of 90% sodium tripolyphosphate and 10% sodium hexametaphosphate did not consistently or effectively effect either salmonella survival or total bacterial count.

Attempts have been made to pasteurize poultry meat by treating the meat with a solution containing agents such as lactic acid, acetic acid, sodium carbonate, sodium borate, sodium chloride, potassium hydroxide, chlorine and EDTA. All 6 treatments, except sodium borate, sodium chloride, and sodium carbonate, reduced the visual acceptability of the meat. Chlorine failed to destroy bacteria on the surface of the poultry but would be expected to control salmonellae in water. See *Chemical Pasteurization of Poultry Meat*, J. S. Teotia, Disseration Abstracts Int'l. B., 1974, 34(a), 4142.

It is known that the shelf life of chicken carcasses can be increased 1 to 2 days by chilling the poultry in a solution of 6% sodium tripolyphosphate/0.7% tetrasodium pyrophosphate (Kena - available from Rhone-Poulenc, Inc., Food Ingredients Division). See *The Antimicrobial Effect of Phosphate With Particular Reference To Food Products*, L. L. Hargreaves, et al., The British Food Manufacturing Industries Research Association, Scientific and Technical Surveys, No. 76, April, 1972, Pages 1-20 at Page 12. Many patents and articles suggest the use of polyphosphates in preserving meat and fish products.

In addition, it is also stated in the Hargreaves reference at page 7 that G. Pacheco and V. M. Dias in an article entitled *Bacteriolytic Action of Phosphates*, Mems Institute Oswaldo Cruz, 52 (2) ppg. 405-414, reported on the bacteriolytic action of solutions of monosodium, disodium, trisodium and dipotassium orthophosphates on dead and living cells of *Salmonella typhosa, Escherichia coli and Staphylococcus aureus*. Trisodium phosphate dodecahydrate is stated to have the greatest lytic action. The reference does not relate to treating meat or fish.

British patent 935,413 teaches treating raw poultry in the chill tank with a non-cyclic polyphosphate. It is taught that this method provides increased preservation of the poultry flesh by decreasing exudate and thereby decreasing spread of bacteria.

Trisodium phosphate has also been found to be effective in inhibiting the growth of blue mold in cuts and bruises in fruit by treating the broken surface with the solution of trisodium phosphate (U.S. Pat. No. 1,774,310).

Trisodium orthophosphate is also a known and widely used anticaking agent (see U.S. Pat. No. 2,770,548).

SUMMARY OF THE PRESENT INVENTION

In accordance with the present invention, there is provided a process for treating red meat carcasses to remove, reduce or retard bacterial growth, such as salmonella, campylobacter, listeria and spoilage bacteria, without affecting the organoleptic properties of the meat. The process comprises surface treating the red meat carcasses, preferably prior to rigor, by contacting the surfaces with a solution of trialkali orthophosphate above pH 11.5 without appreciably changing the color of the meat by causing a darkening of the muscle tissue resulting from high pH. By contacting the red meat prior to rigor, however, lactic acid produced during rigor partially or totally neutralizes the trisodium orthophosphate and further reduces any extreme pH effect on color. Alternatively, a water and/or acid wash may be employed to neutralize any orthophosphate remaining on the surface after treatment.

The treatment is preferably conducted during slaughter either prior to or after chilling by dipping or preferably spraying the orthophosphate solution onto all surfaces of the carcass for several minutes. Preferable treatment is done before rigor on set.

Specifically, it has been discovered that pork, beef, veal, mutton, and goat carcasses can be treated with from about 4% to saturation of a solution of trisodium or tripotassium orthophosphate dodecahydrate or an equivalent amount of the anhydrous compound.

By use of this process the carcass can be treated economically and simply with a food grade product to achieve salmonella and other bacteria control without organoleptic depreciation of the carcass. Other benefits are evident from the description that follows.

DETAILED DESCRIPTION OF THE INVENTION

Trialkali metal phosphate is an orthophosphate salt of the formula $R_3PO_4$ with a formula for the sodium salt being $Na_3PO_4$ and an equivalent formula for the tripotassium compounds. R is an alkali metal of sodium or potassium. Trisodium phosphate has a minimum of 41.5% $P_2O_5$ and a typical pH in a 1% solution of about 11.8.

Trisodium phosphate is available as the dodecahydrate and in commerce the dodecahydrate is available in technical or food grade. Preferably the dodecahydrate (ether form) is used. As used herein trisodium phosphate is intended to include tripotassium phosphate as well as all forms of those compounds.

The invention is applicable to any red meat including pork, beef, veal, mutton, lamb and goat either whole carcass or fresh parts, preferably before rigor and at least treated before appreciable color change is evident from the treatment.

After the animal is killed, bled, skinned and eviscerated, the carcass is normally chilled. The carcass surface is then treated with a trialkali metal orthophosphate either before, during or after chilling. The carcass is treated with a treatment solution containing from about 4% to saturation, preferably from about 6% and more preferably from about 8% to saturation of trialkali metal orthophosphate by weight of solution. From about 4% to 12%, preferably 6-12%, and most preferably from about 8% to 12% orthophosphate have been effective particularly at chilled temperature.

The carcass can be dipped in the treatment solution preferably with solution agitation to increase contact of the treatment solution with all surfaces and crevices of the carcass. The treatment solution is preferably applied by mechanical sprayers, usually under high pressure to insure good contact of the treatment solution with the meat surface. The treatment solution preferably contains only trialkali metal orthophosphate as the means to control, reduce, retard or remove bacteria. No alcohol, nitrate or nitrite, or ascorbic acid is employed in the treatment solution for purposes of enhancing the effect of the orthophosphate. The treatment solution may contain other ingredients for water binding, cleaning, flavoring, coloring and the like. Salts may be used, including chlorides and the like. Normally, except in pumping solutions, other phosphates are not combined with the orthophosphate.

The treatment solution preferably comprised of trialkali metal orthophosphate in an amount sufficient to provide a pH above about 11.5 and preferably within a range from 11.6 to 13.5 and most preferably from about pH 12 to pH 13.5.

The treatment solution is employed before, during or after evisceration and preferably before rigor. While any temperature application is possible, it is preferred to treat the carcass at a temperature which does not cause flavor, color or appearance change usually at about the carcass temperature. In most cases the treatment solution temperature is below 40° C. preferably equal to or below about 27° C. When treating chilled meat, this temperature could be below 10° C. Preferably the red meat is treated either before or directly after skinning and usually prior to chilling with a solution consisting essentially of trialkali orthophosphate at from 4% to saturation.

The carcass surface is contacted with the treatment solution for a period of time sufficient to remove, retard or reduce bacterial contamination and/or growth over and above that obtainable if pure water were used. Treatment dwell time is sufficient, under conditions of treatment, to contact all contactable exposed surface of the carcass, effecting a washing of the surfaces. If desired, a layer of orthophosphate may be left on the carcass to prevent or retard further bacterial growth so long as significant discoloration of the carcass or resulting cut meat products is avoided.

At atmospheric pressure, in a dip tank, dwell times from 5 seconds to about 30 minutes are effective, while dwell times using a spray range from several seconds to several minutes or 2 seconds to 15 minutes with spray times of less than 30 seconds preferred.

The high pH of over 11.5 preferably about pH 12 or above is critical to remove, reduce or retard bacterial contamination or growth. The mechanism is not entirely understood, but the orthophosphate appears to improve bacterial removal as well as retarding growth of any residual bacteria.

In a preferred embodiment of this invention, red meat is treated with trialkali metal orthophosphate prior to pumping cuts of meat with salts, nitrate and the like. The trialkali metal phosphate treatment prevents bacteria from being driven into the meat during pumping which could result in later spoilage. By treating the surface first with orthophosphate any bacteria are removed or controlled prior to the pumping operation.

Immediately after treatment the meat can be processed by usual meat processing techniques.

If a high level of orthophosphate is present which could cause discoloration, then the red meat must be treated with water and/or a dilute acid to adjust the meats pH. However, if treated before rigor, the lactic acid generated from rigor assists in controlling the browning of muscle meat.

We have found the trialkali metal orthophosphate is effective against salmonella, campylobactar, listeria, spoilage bacteria and the like.

EXAMPLE

Carcass Preparation

A barrow was slaughtered and split in half. The right side was used as Control and the left side was treated with trisodium orthophosphate (TSP). One hour and fifteen minutes post-slaughter (pre-rigor), the left side was totally submerged in a solution (pH 13.14) containing 10% TSP for 2 minutes, then subsequently placed in a 38° F. cooler with the control for 48 hours.

Microbiological Procedures

Fifteen minutes following treatment, both Control and orthophosphate carcasses were surface swabbed at two locations at a portion of the belly that parallel to the $10^{th}$ rib and an area on the carcass exterior (skin) directly opposite the $10^{th}$ rib sampling location.

The areas were swabbed (18 strokes) with a sterile bent glass rod. The rod was then placed in 50 ml of a phosphate buffer (pH 6.0). One milliliter of the 50 ml solution was then diluted in a 9 ml phosphate buffer (pH 6.0). A total of 6 dilutions were performed. After dilution, 1/10 ml was placed in a petri dish containing a pre-poured agar with 10% sheep's blood. The dishes were incubated for 48 hours at 34 F. Total plate counts were then conducted.

A 48 hour swabbing was also conducted in the same manner as previously mentioned but at 5 different locations. These locations were as follows:
1. Parallel the anterior end of the aitch bone.
2. Diaphragm muscle located ventral to the $10^{th}$ rib.
3. Jowl region.
4. Skin of the ham opposite the aitch bone.
5. Skin of the shoulder opposite the $2^{nd}$ rib.

Meat pH

A meat sample was obtained from the anterior end of the aitch bone (location 1) and the belly located ventral to the $10^{th}$ rib (location 2). A surface pH was taken on each sample. The meat sample was then ground and a composite pH was taken.

Results

TABLE 1

| | pH of Hog Carcasses | |
|---|---|---|
| | pH | |
| Sample Location | Sample Surface | Ground Sample |
| Control: | | |
| Ham - Anterior to the aitch bone | 6.77 | 5.96 |
| Belly - Ventral the 10th rib | 6.58 | 5.72 |
| TSP Treated | | |
| Ham - Anterior to the aitch bone | 6.84 | 5.99 |
| Belly - Ventral the 10th rib | 6.90 | 5.89 |

Results

Muscle pH

Table 1 shows that the surface pH was greater than the ground sample pH but this difference was not greater than the 1.0 pH point at any given location. The TSP treated sample pH was greater than the control for both surface and ground sample pH readings. However, the greatest pH difference was 0.32 between the surface Ph of the control belly and TSP belly. These findings suggest that the little difference between the control and TSP would have no effect on processing or consumer preference.

1.5 Hours Post-Slaughter

There was no distinct visual differences between the control and the TSP treated carcass. The TSP treated carcass did have a slightly darker pigment color but was not that easily recognizable.

The total plate count conducted was inconclusive for both the control and TSP.

48 Hours Post-Slaughter

Visual appearance at this time period was very similar to the 1.5 hour post-slaughter, showing little difference in muscle pigment color between the control and TSP.

TABLE 2

| Total Plate Count 48 Hours Post-Slaughter | |
|---|---|
| Location | 0 Dilution |
| Control: | |
| 1 | 18 |
| 2 | 15 |
| 3 | 12 |
| 4 | 1 |
| 5 | 5 |
| TSP Treated | |
| 1 | 0 |
| 2 | 0 |
| 3 | 0 |
| 4 | 0 |

TABLE 2-continued

| Total Plate Count 48 Hours Post-Slaughter | |
| --- | --- |
| Location | 0 Dilution |
| 5 | 0 |

The Total Plate Count (Table 2) showed bacterial growth in the nondiluted control sample but not the TSP treated sample. The greatest growth was found at the aitch bone followed by the belly, jowl, shoulder (skin) and ham (skin). There was no growth recorded in the dilutions for either the control or TSP treatment.

The Example shows a surprising lack of discoloration of a paired split hog carcass treated pre-rigor with trisodium orthophosphate.

The Example clearly shows the ability of Trisodium Phosphate to control bacterial growth on a hog carcass without affecting the visual appearance of the lean muscle. A 10% trisodium orthophosphate solution was used to submerge the hog carcass for a two minute time treatment gave a complete reduction of total plate count based on 48 hour swabbing done at various locations on the carcass.

Trisodium phosphate either alone or in combination with other additives, with the proviso that the treatment solution of orthophosphate is free of alcohol, nitrite or. nitrates, and ascorbic acid has great potential for use in eliminating salmonella and other organisms red meat carcasses.

What is claimed is:

1. Raw red meat having had its surface treated with a solution comprising at least about 4% trialkali metal orthophosphate in water and having a pH exceeding 12.0, said surface solution having retarded, reduced or removed bacterial contamination and/or growth on the surface of the meat without substantial color change occurring to the raw red meat and further with the proviso that the surface treatment solution did not contain alcohol, nitrate or nitrite or ascorbic acid.

2. The red meat of claim 1 in which the treatment solution containing trisodium orthophosphate is an amount from 4% to saturation and in which salmonella, campylobacter, listeria and spoilage bacteria are retarded, reduced or removed without substantial color change in the red meat.

3. The red meat of claim 2 in which the solution was applied prerigor for 2 seconds to 15 minutes.

4. The red meat of claim 3 selected from the group consisting of pork, beef, veal, mutton, lamb and goat.

5. The red meat of claim 4 treated at a temperature equal to or less than 10° C.

* * * * *